(12) United States Patent
Zethraeus (10) Patent No.: US 12,545,147 B2
(45) Date of Patent: Feb. 10, 2026

(54) ELECTRICAL ROAD TRACK MODULE, SYSTEM AND METHOD

(71) Applicant: ELONROAD AB, Lund (SE)

(72) Inventor: Dan Zethraeus, Lund (SE)

(73) Assignee: ELONROAD AB, Lund (SE)

( * ) Notice: Subject to any disclaimer, the term of this patent is extended or adjusted under 35 U.S.C. 154(b) by 581 days.

(21) Appl. No.: 18/041,277

(22) PCT Filed: Aug. 17, 2021

(86) PCT No.: PCT/EP2021/072807
§ 371 (c)(1),
(2) Date: Feb. 10, 2023

(87) PCT Pub. No.: WO2022/038119
PCT Pub. Date: Feb. 24, 2022

(65) Prior Publication Data
US 2024/0025303 A1    Jan. 25, 2024

(30) Foreign Application Priority Data

Aug. 19, 2020    (SE) .................................... 2050960-0

(51) Int. Cl.
*B60M 3/04*      (2006.01)
*B60M 1/02*      (2006.01)
*B60M 1/30*      (2006.01)
*G01S 13/91*     (2006.01)
*B60L 53/10*     (2019.01)

(52) U.S. Cl.
CPC ................ *B60M 3/04* (2013.01); *B60M 1/02* (2013.01); *B60M 1/30* (2013.01); *G01S 13/91* (2013.01); *B60L 53/10* (2019.02)

(58) Field of Classification Search
CPC .. B60M 1/02; B60M 1/30; B60M 3/04; B60L 53/10; G01S 13/91
See application file for complete search history.

(56) References Cited

U.S. PATENT DOCUMENTS

| 5,041,828 A | 8/1991 | Loeven |
| 2017/0097412 A1 | 4/2017 | Liu et al. |
| 2018/0037136 A1* | 2/2018 | Nelson .................... G01C 21/00 |

(Continued)

FOREIGN PATENT DOCUMENTS

| CN | 106956679 A | 7/2017 | |
| CN | 109922986 A * | 6/2019 | .............. H02J 50/60 |

(Continued)

OTHER PUBLICATIONS

International Search Report of PCT/EP2021/072807 dated Dec. 8, 2021.

(Continued)

*Primary Examiner* — Robert J McCarry, Jr.
(74) *Attorney, Agent, or Firm* — Shih IP Law Group, PLLC (57) ABSTRACT

An electrical road track module is disclosed. The electrical road track module comprising a plurality of segments configured to power a vehicle, the segments being separated along the electrical road track module by electrically isolating members; and a plurality of radar sensors being arranged along the electrical road track module. Also a method for controlling such an electrical road track module is disclosed.

17 Claims, 3 Drawing Sheets

(56) References Cited

U.S. PATENT DOCUMENTS

2018/0342897 A1* 11/2018 Huang .................... B60L 53/55
2019/0176633 A1* 6/2019 Booth .................... B60L 53/60

FOREIGN PATENT DOCUMENTS

| DE | 102018112954 A1 * | 12/2019 | ............ B60L 53/665 |
|----|-------------------|---------|--------------------------|
| JP | S64-66800 A       | 3/1989  |                          |
| JP | 2001-195697 A     | 7/2001  |                          |
| JP | 2011-113413       | 6/2011  |                          |
| JP | 2017-67756        | 4/2017  |                          |
| JP | 2019-503165 A     | 1/2019  |                          |
| WO | 2017/084697 A1    | 5/2017  |                          |

OTHER PUBLICATIONS

Office Action from IN Application No. 202317010964 mailed Aug. 22, 2024, 7 pages.

* cited by examiner

ELECTRICAL ROAD TRACK MODULE, SYSTEM AND METHOD

CROSS-REFERENCE TO RELATED APPLICATION

This Application is the National Stage filing under 35 U.S.C. § 371 of PCT Application Ser. No. PCT/EP2021/072807 filed on Aug. 17, 2021, which claims the benefit of Swedish Patent Application No. 2050960-0 filed on Aug. 19, 2020. The disclosure of which is hereby incorporated herein by reference.

FIELD OF THE INVENTION

The present invention relates to electric road tracks for providing power to vehicles and to safety of such systems, more specifically to an electrical road track module, an electrical road track system, a method for detecting objects.

BACKGROUND ART

Fully or partially electrically powered vehicles are becoming ever more common as the technology improves along with the infrastructure for supporting such vehicles. Electrically powered vehicles allow transportation of goods and people while reducing the use of fossil fuels and reducing the environmental impact compared to conventionally powered alternatives.

The infrastructure along the road nets that support these fully or partially electric vehicles is improving, electric charging stations are now becoming more frequent which allows electric vehicles to stop to recharge their batteries when needed. However, charging a battery for a vehicle at a charging station is still relatively time consuming and this would be especially true for a large vehicle with a battery having a large capacity.

An emerging technology for providing electric power to vehicles electrically has thus emerged, electric road tracks. Electric road tracks provide the possibility of charging or directly powering a vehicle as it is in motion. Electric road tracks are arranged on or integrated into a road and carries electrical power which can be transferred to a vehicle travelling along the road in a number of different ways.

Providing electric power to vehicles via electric road tracks is a new technology and provides many benefits as it could reduce the need to stop for recharging the batteries of an electric vehicle and thus facilitates not only reducing the size of the electric batteries but also that heavy transport vehicles, such as trucks, could more easily be made electrically powered as they would not have to make lengthy stops to recharge their batteries.

Electric road tracks also provide large potential for improving the safety of transportation, be it of cargo or personal transportation, which is overlooked in prior art electric road tracks.

SUMMARY OF THE INVENTION

In view of that stated above, the object of the present invention is to provide a way of improving the safety of travel and also of providing electricity to vehicles by means of electrical road tracks. The object is also to improve on prior art solutions as mentioned above.

To achieve at least one of the above objects and also other objects that will be evident from the following description, there is provided according to a first aspect an electrical road track module. The electrical road track module comprising:
  a plurality of segments configured to power a vehicle, the segments being separated along the track by electrically isolating members; and
  a plurality of radar sensors being arranged along the electrical road track module.

The radar sensors provide robust detection of objects along the electric road track module with low sensitivity for corruption of the detection by the radar sensor for instance when dirt is present on the sensors. The radar sensors provide detection of and distinction between a large number of objects such as vehicles, weather associated objects such as rain/snow and animals moving along the road. This information is valuable for monitoring road conditions and for warning vehicles on the road if necessary.

The plurality of radar sensors may be arranged in pairs, wherein a first radar sensor in the pair is having a dexter sensing direction in relation to a longitudinal extension of the electrical road track and a second radar sensor in the pair is having a sinister sensing direction in relation to the longitudinal extension of the electrical road track. Information regarding if an object detected by the radar sensors is to the left or the right of the electric road can thus be determined.

The first radar sensor in the pair may have a forward or rearward sensing direction in relation to a longitudinal extension of the electrical road track module and the second radar sensor in the pair may have a rearward or forward sensing direction in relation to the longitudinal extension of the electrical road track.

The plurality of radar sensors may be arranged in the electrically isolating members.

The electrical road track module may further comprise control circuitry configured to receive radar sensing signals from the plurality of radar sensors. The control circuitry facilitates processing and management of data from the radar sensors signals, i.e. data in the shape of traffic flow information and/or weather condition data.

The control circuitry may further be configured to activate and/or deactivate segments of the electrical road track module based on the radar sensing signals from the plurality of radar sensors.

The electrical road track module may further comprise a plurality of light indicators configured to be controlled based on radar sensing signals from the plurality of radar sensors. The light indicators facilitate providing information from the radar sensors to vehicles travelling on the road, e.g. that traffic has stopped ahead or that animals/persons are moving on the road etc.

In a second aspect is an electrical road track system provided. The electrical road track system comprising:
  a plurality of electrical road track modules according the first aspect arranged along a road;
  a control server comprising control circuitry configured to receive radar sensing signals from the plurality of radar sensors.

The electrical road track system could thus monitor and relay information and gather data regarding traffic, obstacles on the road and weather etc. from large areas which facilitates improving safety of the electric road track system and of travel in general.

The control circuitry may be configured to activate and/or deactivate segments of the electrical road track modules based on the radar sensing signals from the plurality of radar sensors.

The control circuitry may further be configured to execute a traffic flow function configured to accumulate statistical information on vehicles travelling along the road along which the plurality of electrical road track modules are arranged, based on received radar sensing signals.

The control circuitry may further be configured to execute a weather monitoring function configured to determine a weather condition based on received radar sensing signals.

The control circuitry may further be configured to execute an alarm function, configured to generate an alarm signal based on received radar sensing signals. For instance, if standstill traffic is detected, an animal/person is detected and/or if severe weather conditions are detected, the alarm may be generated to alert drivers of vehicles on the road of the danger ahead. Moreover, the alarm signals may be transmitted to mobile devices, e.g. to a dedicated application thereof, to a cloud-based server, to emergency services and/or be transmitted by means of the light indicators.

The control circuitry may be configured to analyze received radar sensing signals to determine a type of object which causes the radar sensing signals, facilitating providing accurate information for monitoring the conditions related to traffic and/or weather and/or other objects detected by the radar sensors such as animals/persons moving on the road.

The control server may further be configured to transmit the alarm signal to vehicles travelling along the road along which the plurality of electrical road track modules are arranged.

Each electrical road track module may comprise a plurality of light indicators, and the control server being further configured to control the light indicators based on the alarm signal. The alarm signal can thus be transmitted in a simple and reliable way to alert drivers of vehicles on the road that an alarm is generated by a detected object ahead.

In a third aspect is a method for controlling an electrical road track module provided. The electrical road track module comprising a plurality of segments configured to power a vehicle, and a plurality of radar sensors being arranged along the electrical road track module. The method comprises sensing presence of objects along the electrical road track module by analyzing radar signals from the radar sensors; and activating and/or deactivating segments of the electrical road track module based on the presence of objects along the electrical road track module.

The method thus allows improvements in the safety of the electric road track module and of the safety of travel along a road on which an electric road track module is provided. Statistical information regarding the traffic flow and of weather conditions may further be generated, facilitating providing information of for instance where traffic congestions often occur, traffic density on a certain road, where animals tend to pass over a road etc.

The method may comprise analyzing the radar signals in order to filter out objects in the form of vehicles and accumulating statistical information on the vehicles travelling along the electrical road track module.

The method may further comprise generating an alarm signal based on radar signals and warning, based on the generated alarm signal, vehicles travelling along a road along which the electrical road track module is arranged. The warning may be generated if the traffic and/or weather conditions are detected which are significant enough to merit a warning. E.g. if traffic is slow-moving or stationary, if severe weather conditions are detected etc.

The act of warning may comprise actuating light indicators of one or more electrical road track modules arranged along the road along which electrical road track module is arranged.

The method may further comprise analyzing the radar signals in order to filter out objects in the form weather associated objects and monitoring the weather condition at the electrical road track module by analyzing radar signals from the plurality of radar sensors.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
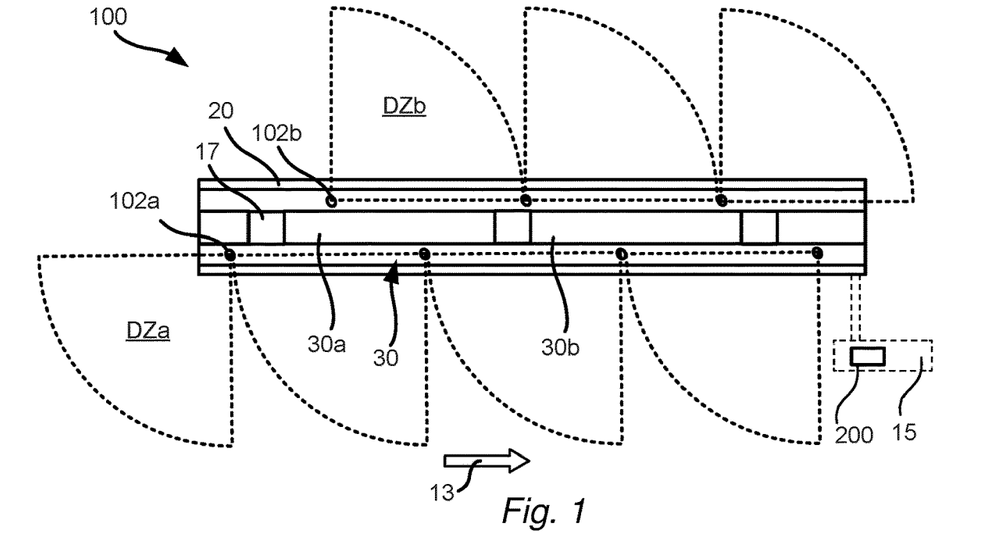
FIG. 1 discloses a top view of an electrical road track module.
Figure 5:
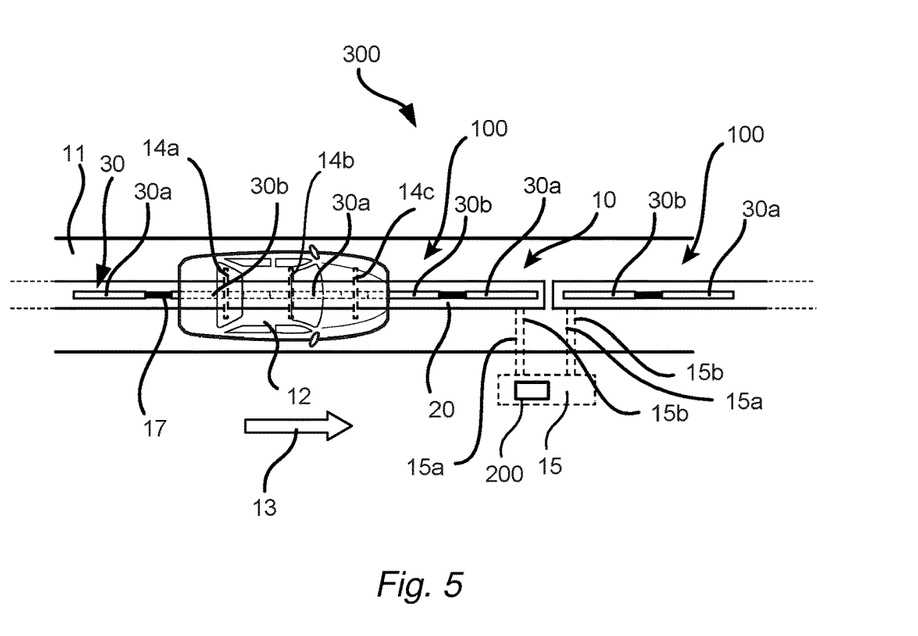
FIG. 5 discloses a top view of an electrical road track system.

FIG. 1 shows an electrical road track module 100 in a top view. The electric road track module 100 is intended to provide electric power to a vehicle 12 (shown in FIG. 5). The electric road track module 100 may form part of an electric road track system 300 as shown in FIG. 5 or be a stand-alone unit for instance for providing stationary charging to a vehicle 12 for instance at a parking lot.

The general function of the electric road track module 100 is that it provides electrical power to electric vehicles 12. Thus, a battery of the electric vehicle 12 can be charged while the electric vehicle 12 is travelling on the road or is parked above the electric road track module 100. Alternatively, or in combination, the motors of the electric vehicle 12 can be continuously powered by electricity. For powering and/or charging the electric vehicle 12, the electric vehicle 12 may comprise power collectors 14a, 14b, 14c (shown in FIG. 4) which draws power from the electric road track module 100.

The electrical road track module 100 comprises a plurality of segments 30a, 30b, at least two segments 30a, 30b. The segments 30a, 30b may form a track line 30 power transmission from the electrical road track module 100 to the vehicle 12.

The segments 30a, 30b are separated along the electric road track module 100 by electrically isolating members 17. The segments 30a, 30b and the isolating members 17 may be arranged in a housing 20. Every second segment 30a may be configured to be powered by a power station 15. The segments 30a configured to be powered form a first set of segments 30a. The power station 15 may e.g. be located at the side of the road. The power station 15 may be connected to the electrical road track module 100 via conductors 15a, 15b.

Upon being powered by a positive potential a segment 30a from the first set of segments 30a forms a positive pole. The other segments 30b form a second set of non-powered segments 30b. The non-powered segments 30b may be set to have the same potential as ground. Alternatively, a segment of the first set of segments 30a may be powered by a negative potential and thus form a negative pole. Upon powering one of the segments 30a of the first set of segments, a voltage difference is created between the powered segment 30a and the non-powered segments 30b. Hence, electric road track module 100 is segmented into a plurality of segments 30a, 30b arranged to provide alternating potentials.

The segments 30a, 30b are arranged such that, at any moment during travelling, at least one of the power collectors 14a, 14b, 14c is in connection with a segment 30a of the first set of segments 30a and at least one other of the power collectors 14a, 14b, 14c is in connection with a segment 30b of the second set of segments 30b. Thus, continuous collection of power from the electrical road track module 100 may be achieved upon the segments 30a of the first set of segments 30a are being powered.

The electric road track module 100 preferably comprises at least one of the first type of segments 30a and one of the second type of segments 30b, however the electric road track module 100 may comprise a plurality first type segments 30a and a plurality of second type segments 30b.

The segments 30a, 30b have a length, along an extension in the traveling direction 13 of the vehicle, being shorter than a length of the vehicle 12. According to a non-limiting example the length of the segments 30a, 30b are around 1 m long. The electrically isolating member 17 may be about 10-30 cm long. A plurality of electrical road tracks modules 100 can be arranged after each other as will be further explained in relation to FIG. 5.

The electric road track module 100 may further comprise a control server 200. The control server 200 may be arranged in the power station 15 and/or in the electric road track 100 and/or as a remote server such as a cloud based server. The control server 200 may be formed by a single unit or as a distributed unit over several units and is configured to carry out overall control of functions and operations of one or several electric road track modules 100. The control server 200 will be further described in relation to FIG. 5.

According to what is described in the foregoing, the teachings herein are especially beneficial for electric road track modules 100 configured for conductive electric power transfer. However, the teachings herein are nonetheless equally applicable to e.g. electric road tracks using inductive power transfer as well and also other electric power transmission methods.

The present disclosure is based on the realization that electric road track systems and road track modules provide large potential for gathering and providing information to vehicles and to others such as emergency services etc. Further still, as electric road tracks are still a relatively new technology, the safety of prior art electric road tracks is an area of continuous improvement.

In this context, the electric road track module 100 in the present disclosure is provided with a plurality of radar sensors 102a, 102b being arranged along the electrical road track module 100. The radar sensors 102a, 102b may be miniature radar sensors such as a pulsed radar sensor, a coherent radar sensor or preferably a pulsed coherent radar. Other types of radar sensors 102a, 102b are also equally applicable and the teachings herein are not limited to the types of radar sensors mentioned above.

However, for the sake of achieving the desired accuracy, the radar sensors 102a, 102b should preferably have short wave length, preferably in the mm range. The radar sensors 102a, 102b will thus be able to detect objects as small as raindrops and minor debris such as rocks or similar that may cause damage to the vehicle 12 or the power collectors 14a, 14b, 14c.

The radar sensors 102a, 120b preferably have a maximum range of between 1 m to 5 m but may also have both longer and shorter maximum ranges.

Detection zones DZa and DZb of the first radar sensor(s) 102a and second radar sensor(s) 102b are illustrated in FIG. 1. The outlined detection zones DZa and DZb in FIGS. 1 to 3 are however not limiting but mainly for illustrative purposes, the respective detection zones DZa, DZb may vary and for instance overlap or have other directions and ranges depending on the application.

However, as is illustrated in FIG. 1, a first radar sensor 102a, or a plurality of first radar sensors 102a, may be arranged with a dexter sensing, i.e. rightward, direction in relation to a longitudinal extension 13 of the electrical road track module 100. The longitudinal extension 13 may be considered the intended direction of travel along the electric road track module 100. A second radar sensor 102b, or plurality of second radar sensors 102b, may have a sinister, i.e. leftward, sensing direction in relation to the longitudinal extension of the electrical road track module 100. Each sensor 102a, 102b may be configured to detect objects in a respective detection zone DZa, DZb having a lateral detection angle of 0° and 90° in relation to the longitudinal extension 13 of the electrical road track module 100.

Figure 2:
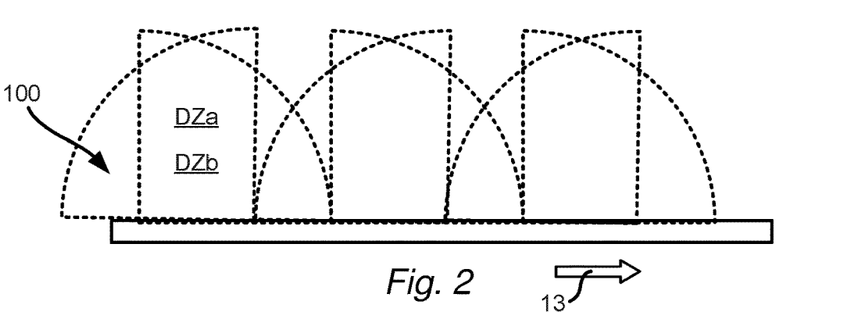
FIG. 2 discloses a side view of an electrical road track module.
Figure 3:
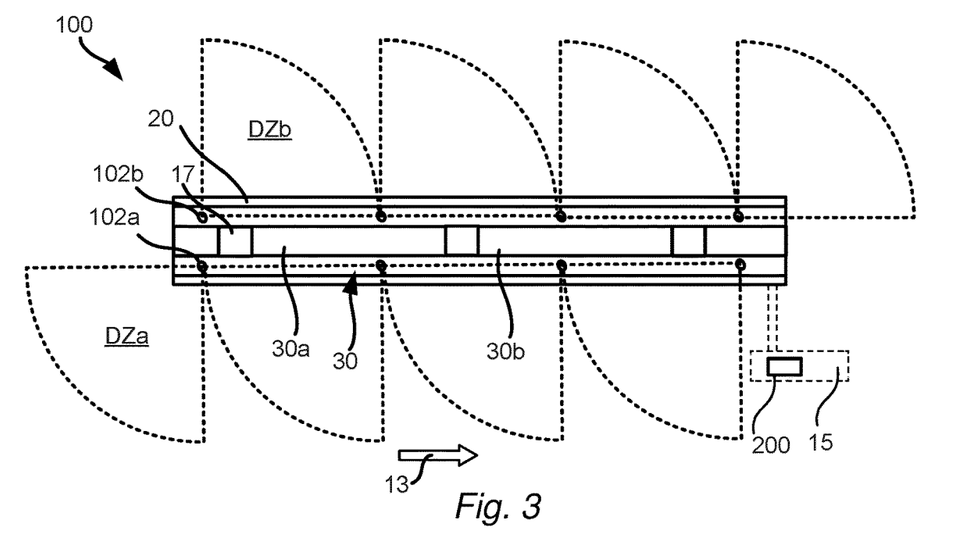
FIG. 3 discloses a top view of an electrical road track module.

Moreover, as is illustrated in FIG. 2 which shows a side view of the electric road track module 100 in FIG. 1, and further applicable to all embodiments herein, the first and second radar sensor(s) 102a, 102b may have a sensing direction such that they are angled upwards in relation to the plane of the electric road track module 100. I.e. such that each sensor 102a, 102b may be configured to detect objects in a respective detection zone DZa, DZb having a vertical detection angle of 0° and 90° in relation to the longitudinal extension 13 of the electrical road track module 100. The vertical detection angle may be as large as 180°.

Further, as is illustrated in FIG. 1, the first radar sensor(s) 102a may be arranged having a rearward sensing direction in relation to a longitudinal extension 13 of the electrical road track module 100. The second radar sensor(s) 102b may be arranged having an opposite forward sensing direction in relation to the longitudinal extension 13 of the electrical road track module 100. Naturally however, the opposite arrangement is also possible. Furthermore, both the first and second sensor(s) 102a, 102b may be arranged facing in a forward or rearward sensing direction.

In certain applications in which angular information is desired regarding detected objects, data from the each of the first sensor(s) 102a and/or from each of the second sensor(s) 102b may be combined, e.g. in the control server 200, for instance for multilateration and/or trilateration purposes.

Each radar sensor 102a, 102b may be arranged in the electric road track module housing 20. In certain applications, each radar sensor 102a, 102b may be arranged behind a plastic cover which allows radar signals from the radar sensors 102a, 102b to be effectively transmitted therethrough without causing disruptions or distortions of the radar signals. For embodiments in which the electric road track module 100 is configured to be integrated into a road, i.e. such that it is essentially flush with the road surface, the plastic cover may form a slight protrusion from the electric road track module 100 and/or be arranged at an angle such that the radar sensors 102a, 102b can effectively detect in the lateral direction and/or longitudinal direction in relation to the longitudinal extension 13 of the electric road track module 100. Naturally, such an arrangement of the radar sensors 102a, 102b is also possible for other embodiments of the electrical road track module 100 such as when the electrical road track module 100 is arranged fixated on top of a road surface.

As is illustrated in FIG. 3, which shows an electric road track module 100 from a top view, the plurality of radar sensors 102a, 102b may be arranged in pairs. Preferably such that one first radar sensor 102a and one second radar sensor 102b that forms a pair are both arranged on either lateral side of the electrical road track module 100 and on the same longitudinal position along the longitudinal extension 13 of the electrical road track module 100.

Figure 4:
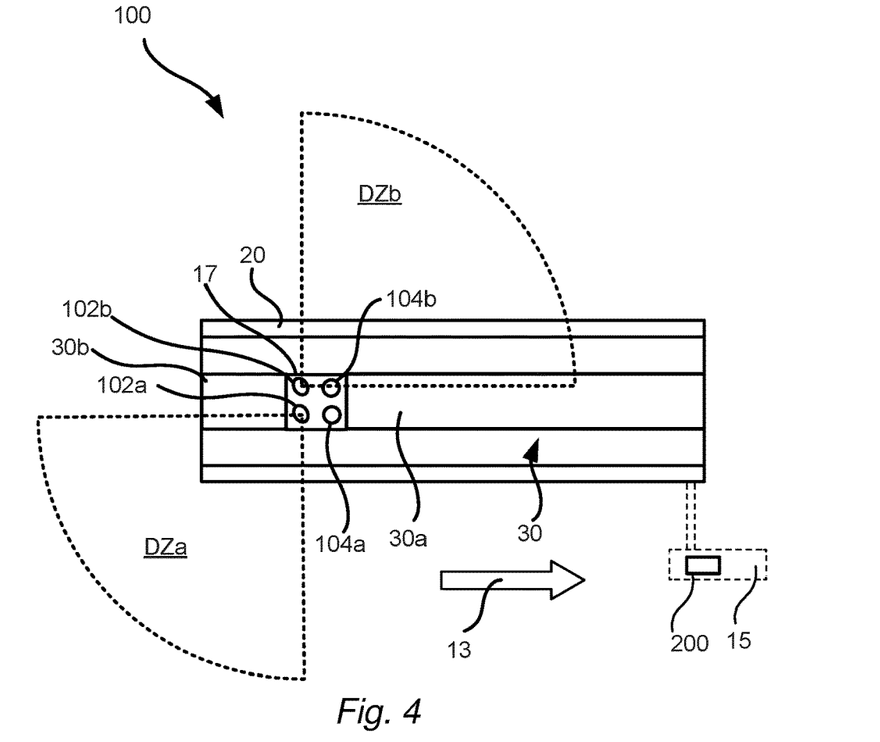
FIG. 4 discloses a top view of an electrical road track module.

FIG. 4 shows a top view of an embodiment of the electrical road track module 100 in which the radar sensors 102a, 102b are arranged in the electrically isolating members 17 of the electrical road track module 100.

The electrical road track module 100 may further comprise a plurality of light indicators 104a, 104b configured to be controlled based on radar signals from the plurality of radar sensors 102a, 102. The light indicators 104a, 104b may indicate to a driver of a vehicle 12 travelling on the road on which the electrical road track module 100 is arranged that an obstacle or bad weather etc. is expected ahead. The light indicators 104a, 104b may be activated by any radar sensor 102a, 102b and not necessarily the nearest radar sensor 102a, 102b. The light indicators 104a, 104b may thus be controlled via the control server 200.

Moreover, the radar sensors 102a, 102b, or the control server 200 interpreting the signals from radar sensors 102a, 102b, may be configured to differentiate between different detected objects such as the size of the object, if it is stationary or moving, if it is raining or snowing or if standing water/snow is present, if there is congested/stationary traffic ahead, how much traffic that passes over each sensor 102a, 102b etc.

The light indicators 104a, 104b, which may be LED light sources, may thus be controlled accordingly, e.g. by the control server 200, for instance by changing to a corresponding colour, by flashing in different patterns etc for indicating the type of traffic obstruction or hazard ahead. The light indicators 104a, 104b may further be controlled such that they are only active if a vehicle 12 is detected by the radar sensors 102a, 102b along the road 11 on which the obstacle is detected.

The radar sensors 102a, 102b are preferably distributed in the longitudinal extension 13 of the electrical road track module 100. The distance in the direction of the longitudinal extension 13 between two first radar sensors 102a and between two second radar sensors 102b respectively may be between 0.5 m and 5 m. When the radar sensors 102a, 102b are arranged in pairs, e.g. in the housing 20 and/or in electrically isolating members 17, the distance in the direction of the longitudinal extension 13 between two pairs of radar sensors 102a, 102b may be between 0.5 m and 5 m, preferably 4 m. Naturally, the distance between radar sensors 102a, 102b may be both shorter and longer as well.

Turning to FIG. 5 in which an electrical road track system 300 is shown. The electric road track system 300 comprising a plurality of electrical road track modules 100 arranged along a road 11. The electrical road track modules 100 may be arranged on the road 11 or integrated into the road 11 for instance into a groove formed therein.

The electrical road track system 300 further comprises a control server 200 comprising control circuitry 202 configured to receive radar signals from the plurality of radar sensors 102a, 102b. I.e. radar signals indicative of objects detected by the radar sensors 102a, 102b.

The control server 200 may be formed by a physical unit connected to each of the electrical road track modules 100 in the electrical road track system 300. The control server 200 may be further be connected to control servers 200 of one or several of the electrical road track modules 100. Moreover, the control server 200 may be formed as a distributed unit, e.g. by the control servers 200 of the electrical road track modules 200 or as a remote control server 200 for instance by means of cloud computing accessed via a wireless network.

Figure 6:
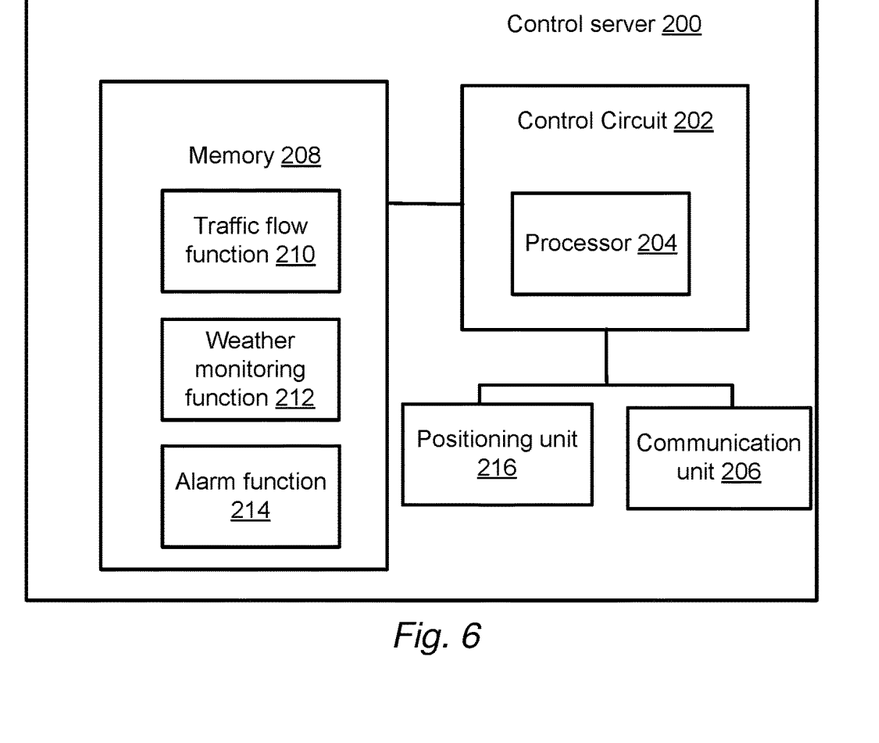
FIG. 6 discloses a schematic block diagram of a control server.

It is to be realized that the electrical road track modules 100 of the electrical road track system 300 does not have to physically connected to each other, the electrical road track system 300 could thus be formed by electrical road track modules 100 being arranged at geographically distant positions in relation to each other and connected wirelessly to each other by means of a communication unit 206, shown in FIG. 6, of the control server 200.

The control server 200 may be arranged in a power station 15, as illustrated in FIG. 5. The power station 15 may be arranged to power one or more of the electrical road track modules 100 of the electrical road track system 300, for instance via electrical conductors 15a, 15b as described in relation to FIG. 1.

With simultaneous reference to FIGS. 5 and 6, where FIG. 6 shows a schematic block diagram of a control server 200 of an electrical road track module 100 and/or of an electrical road track system 300.

The control circuitry 202 may be configured to execute a traffic flow function 210 configured to accumulate statistical information on vehicles 12 travelling along the road 11 along which the plurality of electrical road track modules 100 are arranged, based on received radar sensing signals from the plurality of radar sensors 102a, 102b. The statistical data could thus be used to determine for instance if there is stationary or slow moving traffic on the road 11. The statistical information on vehicles may be received from any radar sensor 102a, 102b of the electrical road track system 300 and gather real-time statistics on the traffic along the road 11 on which the electrical road track system 300 is arranged.

Moreover, the traffic flow function 210 may comprise activating/deactivating a segment 30a, 30b such that segments 30a, 30b where a vehicle 12 is present are active such that the vehicle 12 can draw electrical power therefrom. Segments 30a, 30b where no vehicle 12 is present are correspondingly inactive.

The traffic flow function 210 may comprise transmitting traffic flow statistical data by means of the communication unit 206, for instance for allowing monitoring of the number of vehicles that drives on the road 11, the rate with which the traffic moves, the distance between vehicles 12 on the road 11 and changes in velocity. The information could comprise positioning data indicating the position of the radar sensors 102a, 102b from which the data originates. The traffic flow data could thus be traced and illustrated accurately on a digital map showing traffic flow patterns etc.

The positioning data can be retrieved as the position of each radar sensor 102a, 102b in each electrical road track module 100 and in the electrical road track system 300 is known, which can be used to determine the actual position of an object detected by a radar sensor 102a, 102b.

The control server 200 may for the purpose of determining the position of each electrical road track module 100 in the electrical road track system 300 and of each individual radar sensor 102a, 102b be provided with a positioning unit 216 comprising a GPS positioning unit 216 or another type of positioning unit 216, by means of which the actual position of each radar sensor 102a, 102b and/or each electrical road track module 100 can be determined.

The control circuitry 202 may further configured to execute a weather monitoring function 212 configured to determine a weather condition based on received radar sensing signals from the plurality of radar sensors 102a, 102b. The radar sensors 102a, 102b could thus relay signals to the control server 200 by means of which it could be determined if for instance rain, snow, standing water is present as well as the severity of the weather conditions. Moreover, as described above, the position of the radar sensors 102a, 102 and/or the electrical road track module 100 can be used to determine a position of the determined weather condition. The weather monitoring function 212 may comprise transmitting weather data indicative if there is any precipitation and type thereof etc. by means of the communication unit 206. The information could comprise positioning data indicating the position of the radar sensors 102a, 102b from which the data originates. The weather data could thus be traced and illustrated accurately on for instance a digital map showing if precipitation is to be expected in real-time to a user.

The control circuitry 202 may further be configured to execute an alarm function 214, configured to generate an alarm signal based on received radar sensing signals from the plurality of radar sensors 102a, 102b. The alarm signal may comprise providing signals to a driver of vehicle 12 on the road 11 by means of activating one or several of the light indicators 104a, 104b. The alarm signal may additionally or alternatively be provided by means of the communication unit 206, and may comprise information regarding the type of obstacle, e.g. if a person or an animal is detected, if slow mowing or stationary vehicles are detected, if severe weather conditions are detected etc. The alarm function 214 may thus be initiated based on the determined type of object and/or the severity of the weather condition that is detected by the radar sensor(s) 102a, 102b.

The alarm function 214 may comprise wirelessly transmitting the alarm signal by means of the communication unit 206.

Moreover, the alarm signal may comprise a position, e.g. from a GPS unit of a control server 200 of the electrical road track system 300, indicative of the position of the radar sensor(s) 102a, 102b and/or the electrical road track module(s) 100 from which the alarm signal originated.

As is illustrated in FIG. 6, which illustrates the control server 200 which may be a part of an electrical road track module 100 and/or of an electrical road track system 300 comprising a plurality of electrical road track modules 100. The control server 200 may comprise a control circuit 202 being associated with a memory 208. The control circuit 202 comprises an associated processor 204, such as a central processing unit (CPU), microcontroller, or microprocessor. The processor 204 is configured to execute program code stored in the memory 208, in order to carry out functions 210, 212, 214 and operations of the control server 200.

The memory 208 may be one or more of a buffer, a flash memory, a hard drive, a removable media, a volatile memory, a non-volatile memory, a random access memory (RAM), or another suitable device. In a typical arrangement, the memory 208 may include a non-volatile memory for long term data storage and a volatile memory that functions as system memory for the control server 200. The memory 208 may exchange data with the control circuit 202 over a data bus. Accompanying control lines and an address bus between the memory 208 and the control circuit 202 also may be present.

The control server 200 may further, as mentioned, comprise a communication unit 206, connected to the control circuit 202, configured to allow communication between an electrical road track module 100 and another electrical road track module 100 e.g. to another communication unit 206, between a road track module 100 and another unit such as a mobile device or an application for a mobile device e.g. via a cloud service, a navigation system in a vehicle 12, emergency services etc. The communication unit 206 may provide wired communication for instance between the electrical road track modules 100. Moreover, wireless communication is also possible by the communication unit 206. As is also mentioned in the foregoing, the control server 200 may comprise a positioning unit 216, such as a GPS positioning unit 216 or another positioning unit 216.

The communication by the communication unit 206 may include data transfers, and the like. Data transfers may include, but are not limited to, downloading and/or uploading data such as signals from the radar sensor(s) 102a, 102b and receiving or sending messages. The data may be processed by the control server 200. The processing may include storing the data in a memory, e.g. the memory 208 of the control server 200, executing operations or functions, and so forth.

Functions and operations 210, 212, 214 of the control server 200 may be embodied in the form of executable logic routines (e.g., lines of code, software programs, etc.) that are stored on a non-transitory computer readable medium (e.g., the memory 208) of the control server 200 and are executed by the control circuit 202 (e.g., using the processor 204). Furthermore, the functions and operations 210, 212, 214 of the control server 200 may be a stand-alone software application or form a part of a software application that carries out additional tasks related to the control server 200.

The described functions and operations 210, 212, 214 may be considered a method 1000 that the associated device is configured to carry out. Also, while the described functions and operations 210, 212, 214 may be implemented in software, such functionality may as well be carried out via dedicated hardware or firmware, or some combination of hardware, firmware and/or software.

Figure 7:
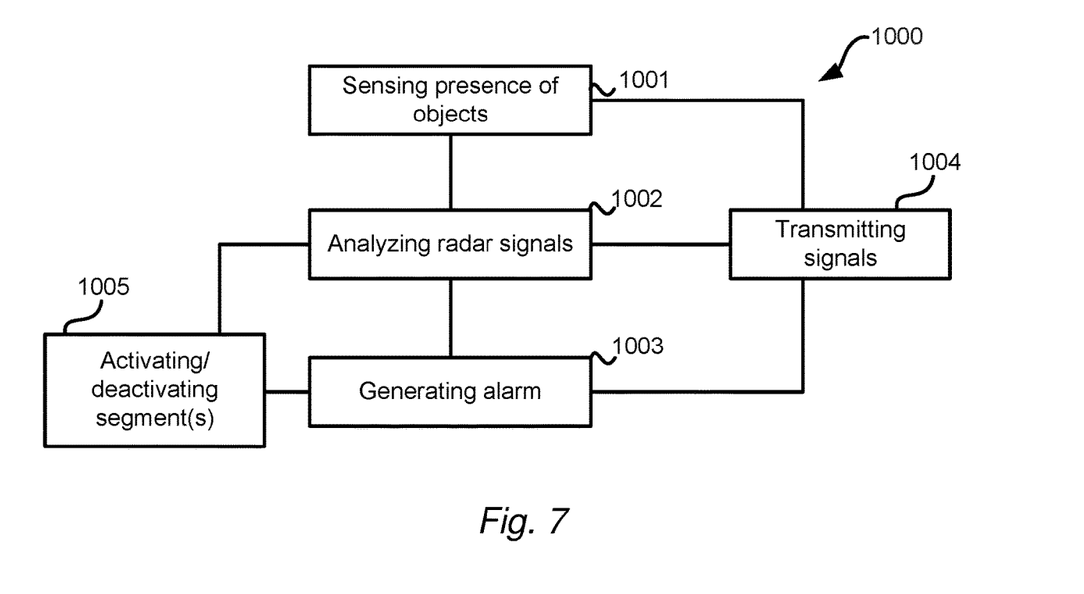
FIG. 7 shows a schematic flow chart of a method for detecting objects along an electrical road track module.

Turning to FIG. 6 which shows a schematic flowchart of a method 1000 for detecting objects along an electrical road track module 100 comprising a plurality of segments 30a, 30b configured to power a vehicle 12 and a plurality of radar sensors 102a, 102b being arranged along the electrical road track module 100. The method comprises:

sensing presence of objects 1001 along the electrical road track module 100 by analyzing radar signals 1002 from the radar sensors 102a, 102b. The radar signal may arise from radar sensors 102a, 102b, on the electrical road track module 100 in which the method 1000 is performed or from another associated electrical road track module 100 forming part of an electrical road track system 300 in which the method is performed.

The method 1000 may further comprise analyzing the radar sensing signals 1002 in order to filter out objects in the form of vehicles 12 and accumulating statistical information on the vehicles travelling 12 along the electrical road track module 100. Traffic flow data, i.e. statistics, can thus be accumulated for information purposes and for monitoring how the traffic situation is along the road 11 along which the electrical road track module 100 and/or the electrical road track system 300 is arranged. The method 1000 may comprise transmitting 1004 traffic flow data by means of a communication unit 206. The data may further comprise positioning data of the radar sensor(s) 102a, 102b and/or the electrical road track module 100 form which the traffic flow data originated. The traffic flow data may be transmitted intermittently at certain time intervals or continuously.

The method 1000 may further comprise analyzing the radar signals 1002 for filtering out objects in the form weather associated objects, such as rain drops, snow fall, standing water and/or snow etc. Weather conditions can thus be monitored by the electrical road track module 100 by analyzing radar signals 1002 from the plurality of radar sensors 102a, 102b.

Accordingly, the method 1000 may comprise accumulating and/or transmitting 1004 information regarding the detected weather condition, i.e. weather data, e.g. by the communication unit 206, to a recipient such as a vehicle 12, a mobile device, or a weather monitoring service etc. The weather condition could thus comprise whether or not rain/snow/hail is detected, if standing water/snow/hail is present and the position of the detected weather condition. The severity of the weather condition could also be determined and included.

I.e., the method 1000 may thus comprise continuously or intermittently transmitting signals 1004, i.e. data, which indicates for instance a weather condition, a traffic situation such as the speed with which the traffic is moving and/or the number of vehicles 12 that passes as detected and filtered out by radar sensors 102a, 102b of an electrical road track module 100 of the electrical road track system 300. The method 1000 may for informative purposes when transmitting signals 1004 incorporate position information regarding where the weather condition and/or traffic situation detected by the radar sensors 102a, 102b is occurring such that the recipient, be it a vehicle 12, a mobile device, another electrical road track module 100, an emergency services provider etc, of the transmitted signals can determine where the signal originates from and thus present the information accordingly for facilitating interpretation of the signals.

The method 1000 may further comprise generating an alarm 1003 based on radar signals and warning, based on the generated alarm signal, vehicles 12 travelling on a road 11 along which the electrical road track module 100 is arranged. For instance, if objects in the form of stationary vehicles or animals are detected by radar sensors 102a, 102b, the warning signal may be transmitted 1004 to a vehicle 12 travelling on the road 11 and/or to other devices directly or indirectly as mentioned above.

The alarm is generated 1003 if it is determined that circumstances on the road 11 are such that it requires vehicles 12 to be notified of it in order to avoid accidents and/or worsening of the traffic situation. For instance, if it is detected by radar sensors 102a, 102b that an animal is moving along the road 11, a warning may be generated 1003 and transmitted 1004 to vehicles 12 which are in travelling on the road 11 in the direction of the where the animal is detected. The warning may be generated 1003 by means of activating the light indicators 104a, 104b and/or by means of transmitting 1004 a warning signal by means of the communication unit 206 which can be received either directly by a wireless receiver of the vehicle 12 or of a mobile device carried by a person in the vehicle 12, and/or via a remote server such as a cloud based server which relays the warning signal to vehicles 12 and/or mobile devices that are travelling on the road 11. The warning signal could further, as mentioned, be transmitted 1004 e.g. to emergency services.

For instance, a navigation system of a vehicle 12 or a mobile device which receives the transmitted alarm signal and/or transmitted data signal indicative of a traffic situation and/or weather condition could integrate the information into a digital navigation map thereof to advice or notify the user of the vehicle 12 and/or the mobile device of the situation on the road 12 in real-time. It could also be used to generate an alternate route to avoid traffic congestions etc.

The method 1000 could further comprise activating and/or deactivating 1005 segments 30a, 30b of the electrical road track module 100 based on the detected radar signals from the radar sensors 102a, 102b. E.g. such that only segments 30a, 30b where a vehicle 12 is present is active. Moreover, the radar sensors 102a, 102b could sense presence of an object 1001 and by analyzing the radar signal 1002 determine the object to be an animal or other object that should not be permitted near an active electrical road track module 100. The method 1000 could thus comprise deactivating 1005 the segments 30a, 30b to prevent injury to the animal/person and/or damage to the electrical road track module 100 and/or to the vehicle 12.

Moreover, the method 1000 may comprise activating the light indicators of one or more electrical road track modules 100 as a means of transmitting the signal 1004 for indicating to vehicles 12 travelling on the road 11 of the traffic situation even if no alarm signal is generated 1003. The light indicators 104a, 104b could as mentioned above be controlled depending on the type of object detected by the radar sensors 102a, 102b. Different indications could thus be provided by the light indicators 104a, 104b if the object is stationary traffic, slow moving traffic, normally/unrestricted moving traffic, an animal, a fallen tree and/or standing water etc. Thus, transmitting signals 1004 and/or generating the alarm 1003 could comprise activating the light indicators 104a, 104b.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. An electrical road track module comprising:
a plurality of segments configured to power a vehicle, the segments being separated along the electrical road track module by electrically isolating members;
a plurality of radar sensors being arranged along the electrical road track module; and
control circuitry configured to receive radar sensing signals from the plurality of radar sensors and to activate and/or deactivate segments of the electrical road track module based on the radar sensing signals from the plurality of radar sensors.

2. The electrical road track module according to claim 1, wherein the plurality of radar sensors are arranged in pairs, wherein a first radar sensor in the pair is having a dexter sensing direction in relation to a longitudinal extension of the electrical road track module and a second radar sensor in the pair is having a sinister sensing direction in relation to the longitudinal extension of the electrical road track module.

3. The electrical road track module according to claim 2, wherein the first radar sensor in the pair is having a forward or rearward sensing direction in relation to a longitudinal extension of the electrical road track module and the second radar sensor in the pair is having a rearward or forward sensing direction in relation to the longitudinal extension of the electrical road track module.

4. The electrical road track module according to claim 1, wherein the plurality of radar sensors are arranged in the electrically isolating members.

5. The electrical road track module according to claim 1, further comprising a plurality of light indicators configured to be controlled based on radar sensing signals from the plurality of radar sensors.

6. An electrical road track system comprising:
a plurality of electrical road track modules arranged along a road, each electrical road track module comprising:
a plurality of segments configured to power a vehicle, the segments being separated along the electrical road track module by electrically isolating members, and
a plurality of radar sensors being arranged along the electrical road track module; and
a control server comprising control circuitry configured to receive radar sensing signals from the plurality of radar sensors and to activate and/or deactivate segments of the electrical road track modules based on the radar sensing signals from the plurality of radar sensors.

7. An electrical road track system according to claim 6, wherein the control circuitry is further configured to execute a traffic flow function configured to accumulate statistical information on vehicles travelling along the road along which the plurality of electrical road track modules are arranged, based on received radar sensing signals.

8. The electrical road track system according to claim 6, wherein the control circuitry is further configured to execute a weather monitoring function configured to determine a weather condition based on received radar sensing signals.

9. The electrical road track system according to claim 6, wherein the control circuitry is further configured to execute an alarm function, configured to generate an alarm signal based on received radar sensing signals.

10. The electrical road track system according to claim 9, wherein control circuitry is configured to analyze received radar sensing signals to determine a type of object which causes the radar sensing signals.

11. The electrical road track system according to claim 9, wherein the control server is further configured to transmit the alarm signal to vehicles travelling along the road along which the plurality of electrical road track modules are arranged.

12. The electrical road track system according to any of claim 9, wherein each electrical road track module comprises a plurality of light indicators, and wherein the control server is further configured to control the light indicators based on the alarm signal.

13. A method for controlling an electrical road track module comprising a plurality of segments configured to power a vehicle, and a plurality of radar sensors being arranged along the electrical road track module, wherein the method-comprises:
sensing presence of objects along the electrical road track module by analyzing radar signals from the radar sensors; and
activating and/or deactivating segments of the electrical road track module based on the presence of objects along the electrical road track module.

14. The method according to claim 13, further comprising analyzing the radar signals in order to filter out objects in the form of vehicles and accumulating statistical information on the vehicles travelling along the electrical road track module.

15. The method according to claim 13, further comprising generating an alarm signal based on radar signals and warning, based on the generated alarm signal, vehicles travelling along a road along which the electrical road track module is arranged.

16. The method according to claim 15, wherein the act of warning comprises actuating light indicators of one or more electrical road track modules arranged along the road along which electrical road track module is arranged.

17. The method according to any one of claim 13, further comprising analyzing the radar signals in order to filter out objects in the form weather associated objects and monitoring the weather condition at the electrical road track module by analyzing radar signals from the plurality of radar sensors.

* * * * *